United States Patent [19]

Sutton

[11] Patent Number: 4,717,258

[45] Date of Patent: Jan. 5, 1988

[54] 3-CHANNEL MICRODENSITOMETER FOR ANALYSIS OF PLATE SPECTRA

[75] Inventor: C. Sean Sutton, Northampton, Mass.

[73] Assignee: Smith College, Northampton, Mass.

[21] Appl. No.: 815,148

[22] Filed: Dec. 31, 1985

[51] Int. Cl.[4] ............................................. G01J 3/40
[52] U.S. Cl. ..................................... 356/444; 356/303
[58] Field of Search ............... 356/302, 303, 300, 443, 356/444

[56] References Cited

U.S. PATENT DOCUMENTS

| | | |
|---|---|---|
| 2,626,989 | 1/1953 | Brown . |
| 2,844,989 | 7/1958 | Price et al. ......................... 356/443 |
| 3,012,466 | 12/1961 | Kliebe . |
| 3,339,076 | 8/1967 | Hilal . |
| 3,413,065 | 11/1968 | Funk . |
| 3,503,689 | 3/1970 | Miller et al. . |
| 3,518,013 | 6/1970 | Sanford et al. . |
| 3,528,749 | 9/1970 | Bowker . |
| 3,717,412 | 2/1973 | Takuma et al. . |
| 3,809,482 | 5/1974 | Aslund et al. . |
| 3,883,251 | 5/1975 | Helava . |
| 3,995,958 | 12/1976 | Pfahl et al. . |
| 4,005,434 | 1/1977 | Golias et al. . |
| 4,059,357 | 11/1977 | Klein .................................. 356/243 |
| 4,061,428 | 12/1977 | Amano et al. . |
| 4,106,601 | 7/1979 | Jacobs ................................ 356/404 |
| 4,229,108 | 10/1980 | Childers ............................. 356/443 |
| 4,236,828 | 12/1980 | Kaneko et al. ..................... 356/444 |
| 4,239,393 | 12/1980 | Tobias ................................ 356/407 |
| 4,242,730 | 12/1980 | Golias ................................ 356/432 |
| 4,266,872 | 5/1981 | Mitsuhashi ......................... 356/443 |
| 4,285,594 | 8/1981 | Butts et al. .......................... 356/72 |
| 4,317,994 | 3/1982 | Mallozzi et al. . |
| 4,329,591 | 5/1982 | Fujiwara et al. ................... 356/444 |
| 4,338,033 | 7/1982 | Kato et al. .......................... 356/444 |
| 4,505,589 | 3/1985 | Ott et al. ............................. 356/402 |
| 4,508,686 | 4/1985 | Shaber et al. ....................... 356/243 |

FOREIGN PATENT DOCUMENTS 1074827  2/1984  U.S.S.R. .............................. 356/444

OTHER PUBLICATIONS

"Bulletin of the American Astronomical Society" 165th Meeting Abstracts, DPS Late Papers, Observatory Reports, vol. 16, No. 4, Dec. 1984.

Steinhaus et al., "Design and Operation of a New Automatic Comparator for Measurement of Spectra", Report Los Alamos Scientific Laboratory, Sep. 7, 1964.

Primary Examiner—F. L. Evans
Attorney, Agent, or Firm—Weingarten, Schurgin, Gagnebin & Hayes

[57] ABSTRACT

A densitometer providing simultaneous sensing of the density in precisely adjacent portions of plural adjacent tracks. The densitometer preferably operates with stellar a pattern in which two reference tracks have been photographically recorded either side of a central specimen track of a star. The simultaneous detection of the three tracks insures a high degree of alignment between the reference and star tracks so that the correlation of their relative positions is a more accurate indication of the shift between the reference and star tracks. Alignment controls and the ability to microscopically view the radiation path through the densitometer facilitates set-up of the system to the high accuracy of results that it can achieve.

14 Claims, 8 Drawing Figures

3-CHANNEL MICRODENSITOMETER FOR ANALYSIS OF PLATE SPECTRA

FIELD AND BACKGROUND OF THE INVENTION

The present invention relates to densitometers for the measurement of the doppler shift in photographically recorded astronomical spectra as an indication of radial velocity of a celestial object's motion.

There exists a large collection of photographic plates dating from the early part of the century in which the spectrum of a star is recorded between two reference spectra, such as that for iron. The plate is analyzed for an indication of the shift in the location of certain spectral features known to exist in celestial spectra, such as hydrogen absorption lines, relative to the position of emission lines or signatures characteristic of the reference spectra. This shift identifies the doppler shift in the stellar track and thus the radial velocity of the body being recorded. In order to determine this shift in the past it has been necessary to scan each track separately to produce a digitized or other representation of each spectrum with some form of positional reference so that the adjacent spectra can be later compared. The multiple scan technique introduced registration errors between the scans and admitted of inaccuracies in the determination of the body's doppler shift.

In addition, the equipment used in the past to scan the tracks was expensive due at least in part to the use of expensive photomultiplier tubes, optical encoders and two dimensional positioning capabilities. Because of the multiple scan technique utilized, added cost was required to achieve precise equipment that would minimize the scan to scan registration errors. The slowness of the prior equipment and its high cost, has kept the vast number of photographic plates from being scanned to any significant degree. This is very unfortunate because the record provided by these plates, extending so far back in time, could provide important information to the astronomical world.

Other technologies can also profit from the presence of equipment capable of high speed and accurate scanning of adjacent reference and specimen spectra. One example includes the field of chromotagraphy where, for example, automated comparison of stained protein jell electrophoresis samples with standards would increase the efficiency of analysis. In molecular biological research on the quantization of DNA sequence copy number or RNA transcript number is dependent upon obtaining accurate autoradiographic signals and comparing them with a known dilution series of appropriate standards.

BRIEF SUMMARY OF THE INVENTION

In accord with the teaching of the present invention, a densitometer is provided in which plural tracks of spectral information are simultaneously illuminated and scanned to provide automated data acquisition of the information embodied in the tracks. The simultaneous illumination and scanning insures a high degree of registration between the data collected from each track so that the doppler shift or other information represented by position differences in characteristic elements of the tracks is accurately and quickly gathered for later processing.

In one embodiment, the invention is applied to the analysis of the central specimen and adjacent reference tracks in stellar photographic plates taken over the past century. In this case, the densitometer of the invention includes a step driven support or holder for the plate. The plate is illuminated from below by radiation passing though a slit oriented across the direction of the tracks and aligned in registration with corresponding frequencies of the two reference tracks to either side of the central specimen track. A second slit parallel to the first is placed on the other side of the tracks and provides collimation in the light passing through the tracks. Diode photodetectors are postioned, one for each of the three tracks, to receive the light from the second slit. Alignment adjustments are provided to insure that the slits can be made both parallel and collimate the light so that its passes simultaneously through identical frequency portions of the reference tracks so that the light through the central specimen track accurately reflects the doppler shift. The signal from each photodetector is digitized and applied to the computer where it is recorded for each position of the photographic plate. After all three signals are recorded for each position, the support is stepped along the direction of the tracks a small distance and the three signals recorded again. In this manner the entire plate is automatically scanned and the resulting signals recorded for later, conventional signal analysis to determine the doppler shift.

The three photodetectors are contained within an assembly which is itself equipped with adjustment mechanisms to positionally adjust the three photodetectors relative to each other. The assembly as a whole is pivoted to permit it to be rotated out of the path of light through the slits so that a microscope can be positioned to view down the light path, facilitating the alignment of the slits.

DESCRIPTION OF THE DRAWING

These and other features of the present invention are more fully set forth in the solely exemplary detailed description below and accompanying drawing of which.

DETAILED DESCRIPTION

The present invention contemplates a densitometer having the capability to simultaneously scan plural adjacent spectral tracks with a high degree of registration between the scanning of each track admitting of high accuracy in the determination of positional shifts between the tracks.

Figure 1A:
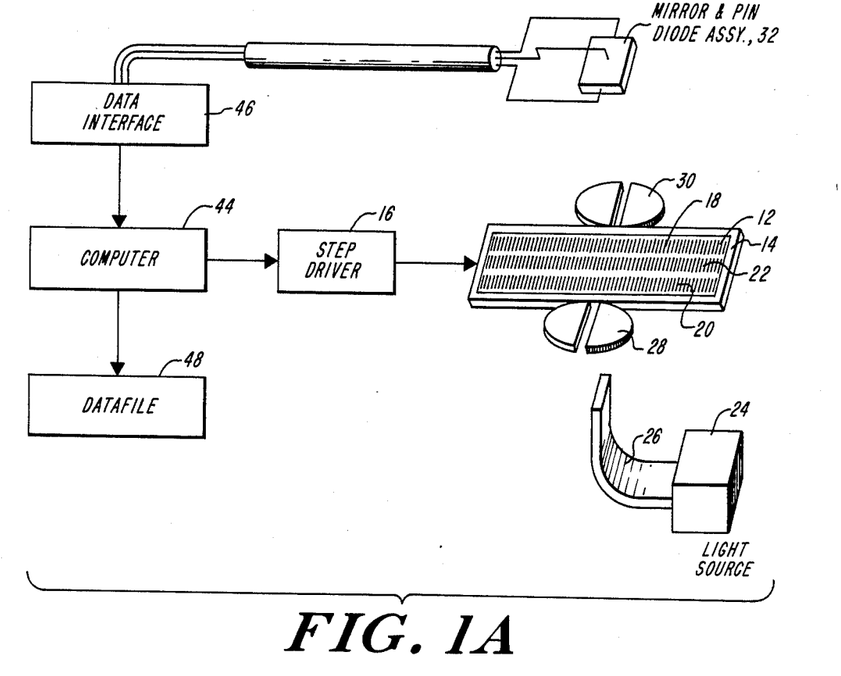
FIGS. 1A and 1B are diagrammatic illustrations of apparatus according to the invention.
Figure 1B:
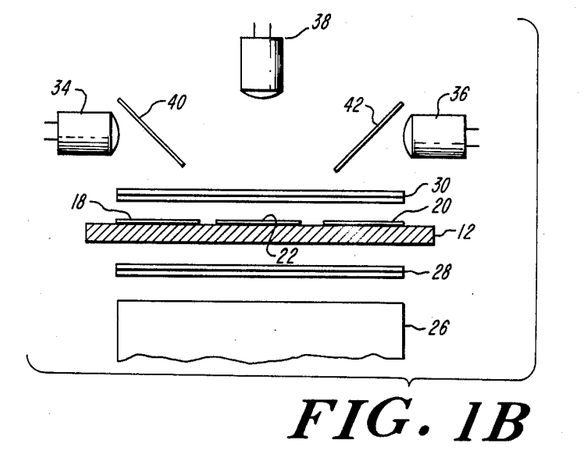

By reference to FIGS. 1A and 1B there is shown a photographic plate 12 in a holder or support 14 and under the control of a step drive 16. The plate 12 has first and second reference spectral tracks 18 and 20 either side of a central specimen track 22 typically of a star or other celestial body, but possibly of some other spectrum, including DNA, RNA or a protein. Illumination from a source 24 is applied through a fiber bundle 26 through a slit 28 across the tracks 18–22. The slit 28 may be formed by the slight spacing of fine edges such as razor blades. Light from the illuminated tracks 18–22 passes through a second slit 30 to an assembly of photodetectors 32. One photodetector is provided for each track 18–22 such that photodetectors 34, 36, and 38 respectively respond to the light through the tracks 18, 20 and 22. Mirrors 40 and 42 are provided within the assembly 32 to divert the light from the outer reference tracks to the corresponding detectors.

The slits 28 and 30 are aligned parallel and oriented so that the light between passes through portions of the tracks 18 and 20 that represent the same spectral region using alignment apparatus described below so that the system is calibrated for high accuracy in the determination of the positional offset of the spectrum in track 22. The tracks 18 and 20 are typically the spectra for iron while the track 22 is the emission or absorption characteristics of a celestial body.

The signals from the detectors within the assembly 32 are applied to a computer 44 through an interface that accomplishes analog-to-digital conversion. The computer stores in data files 48 the digital presentation of the detected density for all three tracks simultaneously at one position of the step drive 16 and then moves it along one step more. The stepping system is typically set to produce 8,000 samples for the specimen track 22 and 4,000, for each of the reference tracks 18 and 20 in a typical photographic plate produced according to the known techniques. It is desired to achieve a resolution of 1.0 km/sec.

Figure 2:
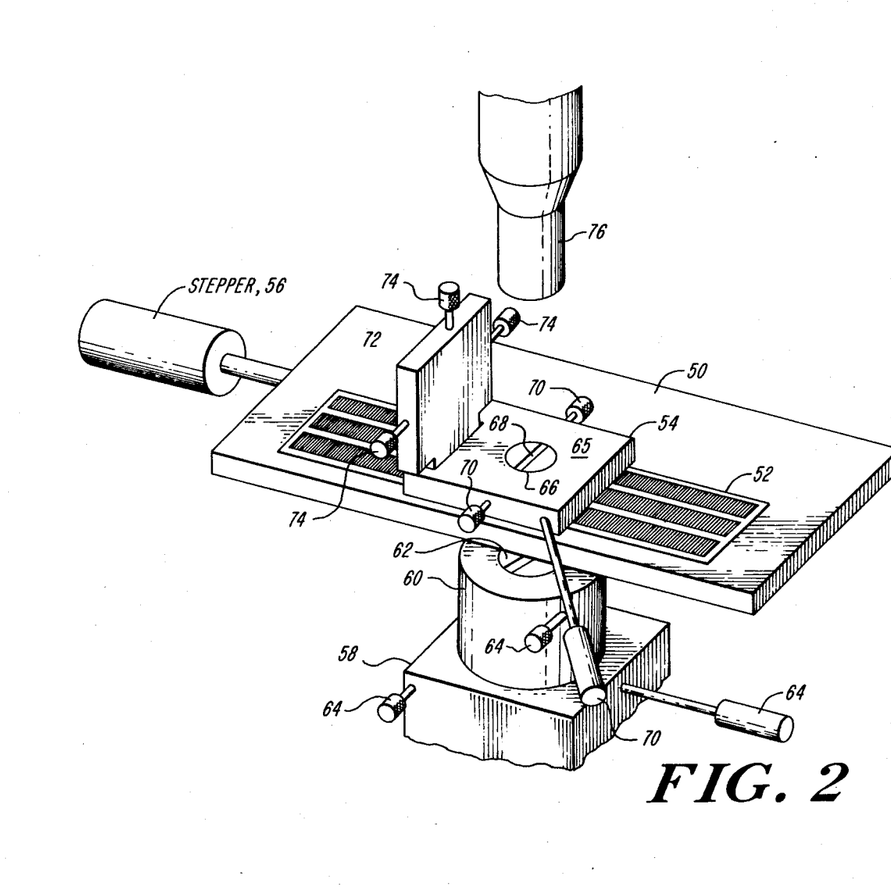
FIG. 2 is a pictorial view of the arrangements of the optical components of one embodiment of the invention.

In FIG. 2 there is shown one embodiment of the optical apparatus of the present invention. A support 50 for a plate 52 is moved relative to an assembly 54 of the photodetectors by the stepper drive 56. Light is applied through the plate 52 from an illumination system 58 containing a base holding a lens 60 having the first slit 62. Micrometer controls 64 are provided in the base and lens to adjust the position of the light source and the angular orientation of the slit 62 to achieve the alignment and registration effects noted above.

The assembly 54 is supported above the support 50 by any convenient structure to maintain its position and alignment with respect to the slit 62. The assembly 54 includes a plate 65 having an aperture 66 aligned above the slit 62 on the opposite side of the plate 52 therefrom. The second slit 68 is located in the aperture 66 and is adjustable in width by adjustment micrometer screw 70. The three photodetectors used to sense the light passing through each of the tracks of the plate 52 are located in a module 72 which is hinged to one edge of the support plate 65. Micrometer screw controls 74 are provided to positionally adjust the detectors relative to each other. The module is swung down over the plate 65 for data aquisition.

With the module swung up out of the way, a microscope having an objective 76 is in position to view the light path through the slits and tracks of the plate enabling alignment using the controls noted above.

Figure 3A:
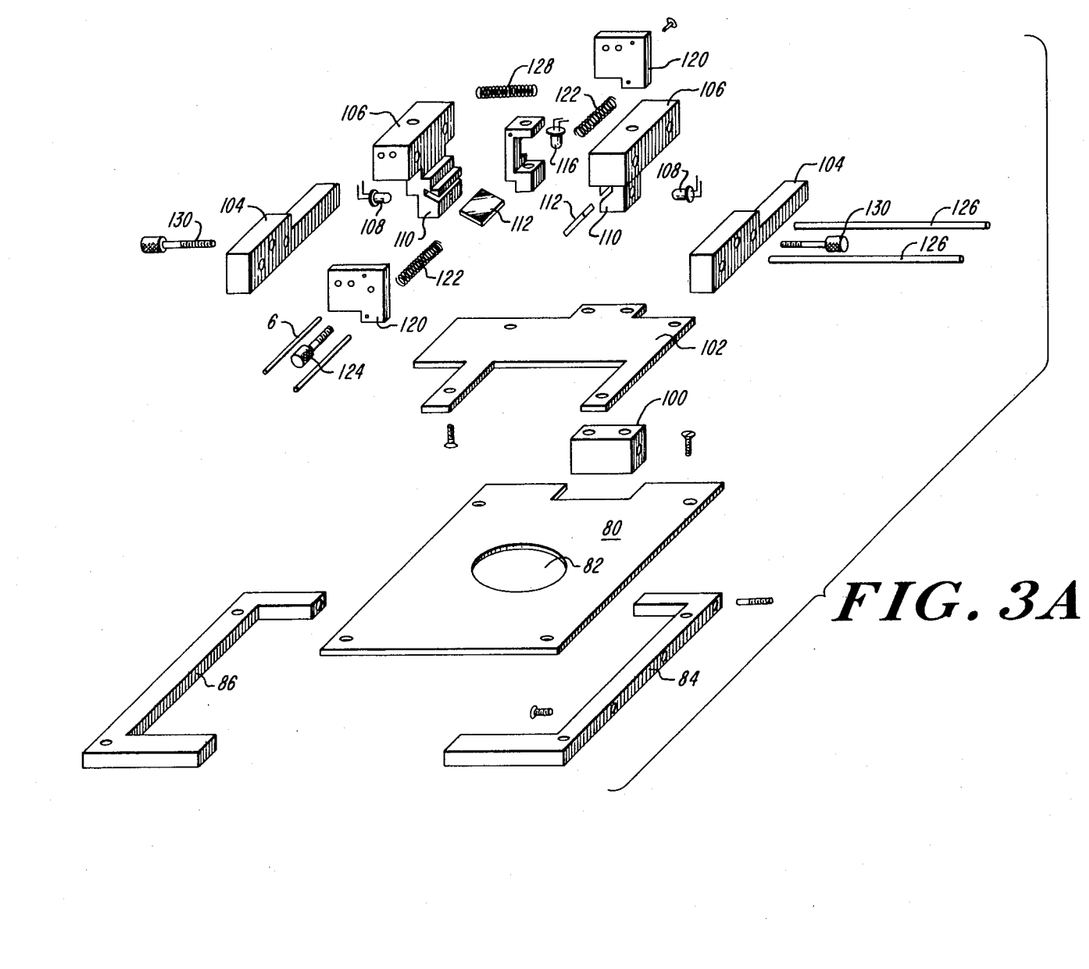
FIGS. 3A and 3B are exploded views of the photodetector assembly of the present invention.
Figure 3B:
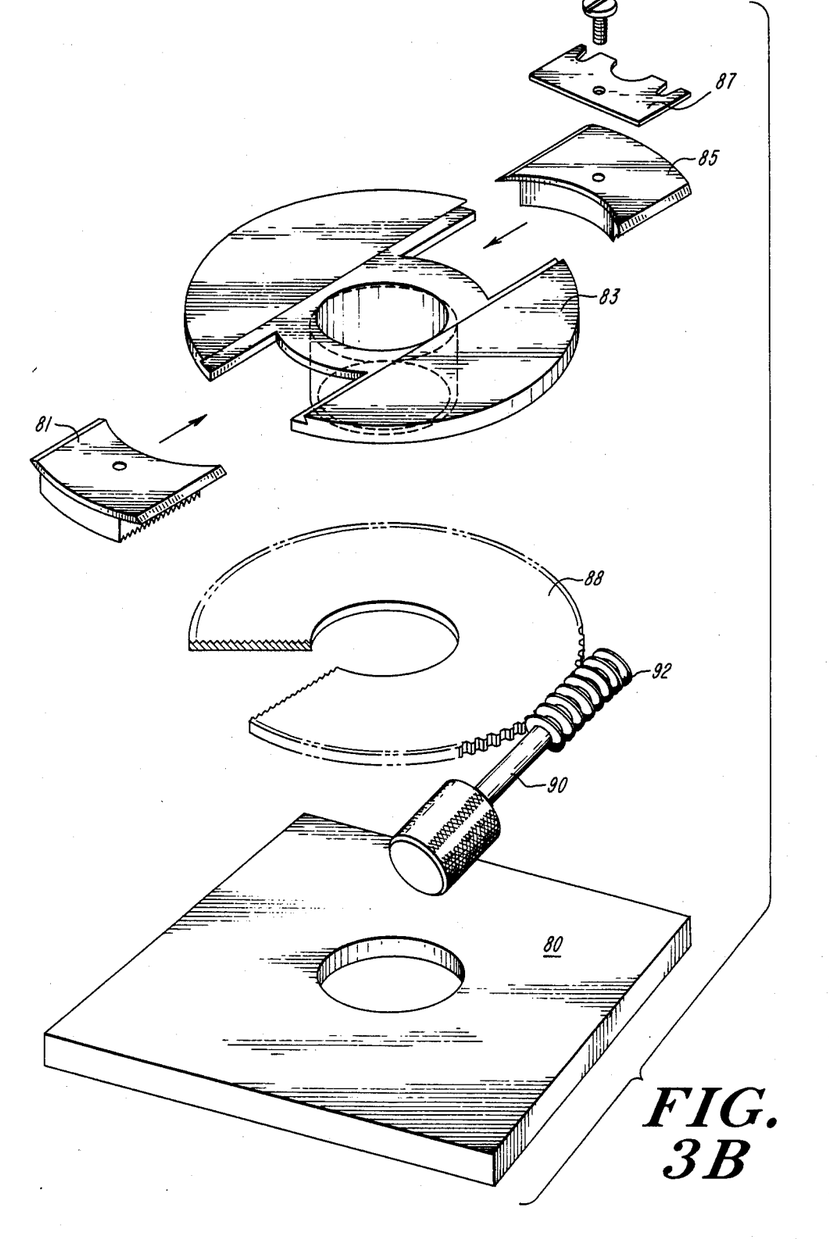

By reference to FIGS. 3A and 3B, the construction of one embodiment of the support plate 65 and module 72 are more fully illustrated. The plate 65 includes a substrate 80 having an aperture 82 , and, attached to the lower surface a pair of facing "C" brackets 84 and 86 to provide stiffening. An apertured shaft on a support disk 83 is positioned within the aperture 82 and secured with respect to the substrate 80. A gear 88 is positioned in the annular space between the substate 80 and the disk 83 and is rotated around the shaft of the disk 83 by a worm gear 92 located on control 70. The surface of the gear 88 facing the disk 83 has a spiral tooth pattern which meshes with a tooth pattern on the bottom projections of slide members 81 and 85. The slide members 81 and 85 ride in and out within a dovetail groove on the disk 83. In this manner the rotation of control 70 causes the slide members to travel toward or away from each other in the groove. Razor blades are clamped onto the slide members 81 and 85 to travel with them during adjustment, insuring that the slit formed between the two razor blades will maintain its center position during width adjustment. By being elongated, the slits accomplish the goal of maximizing the sensitivity of the system by spreading the light across the entire width of each track while maintaining high resolution by its narrowness. The adjustable width of the slit between the two blades permits a trade-off between selectivity of the densitometer and signal-to-noise ratio. An optimum signal-to-noise ratio is thus achievable. Similar considerations go into the design of the lower slit as well.

By reference back to FIG. 3A, there is provided a pivot block 100 to which is attached a support plate 102. To the plate 102 are mounted side cheeks 104 which in turn support first and second detector housings 106. PIN diode photodetectors 108 used to sense the density of the side, reference tracks are secured in downward projections 110. Mirrors 112 are fitted into the projections 110 to reflect light from the slit 68 to the detectors 108 through respective apertures 114. Alignment rods 126 pass through the cheek members 104 which are separated by a spring 128 and adjusted in position along the rods 126 by screw controls 130.

A PIN diode 116 is secured within a sliding member 118 that is slidingly captured between the housings 106. End plates 120 are affixed to the ends of one of the housings 106 and support the member 118 between springs 122 and alignment rods 126. A micrometer adjustment 124 permits the center detector to be adjusted in position relative to the other two.

Figure 4:
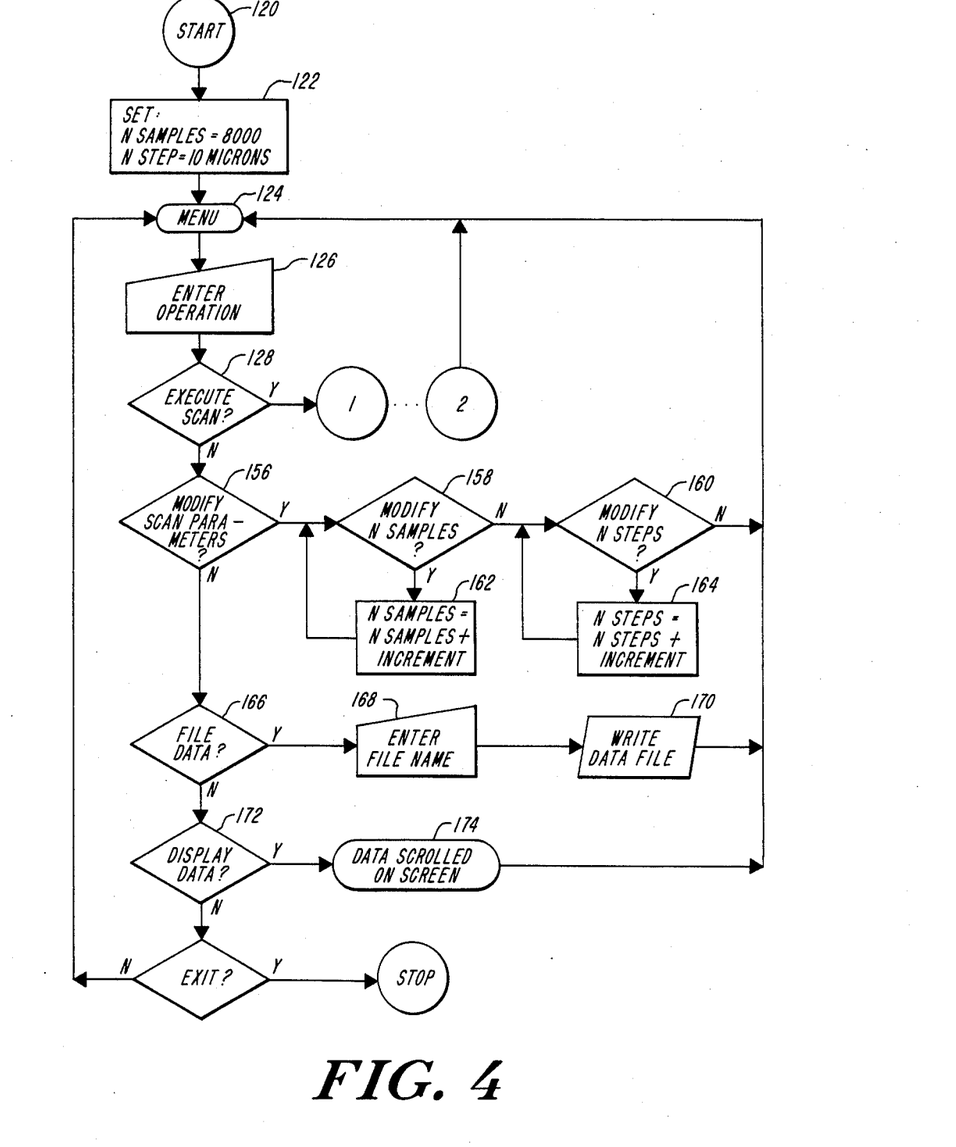
FIGS. 4 and 5 are flow charts illustrating the operation of the computer control components of the illustration of FIG. 1A.
Figure 5:
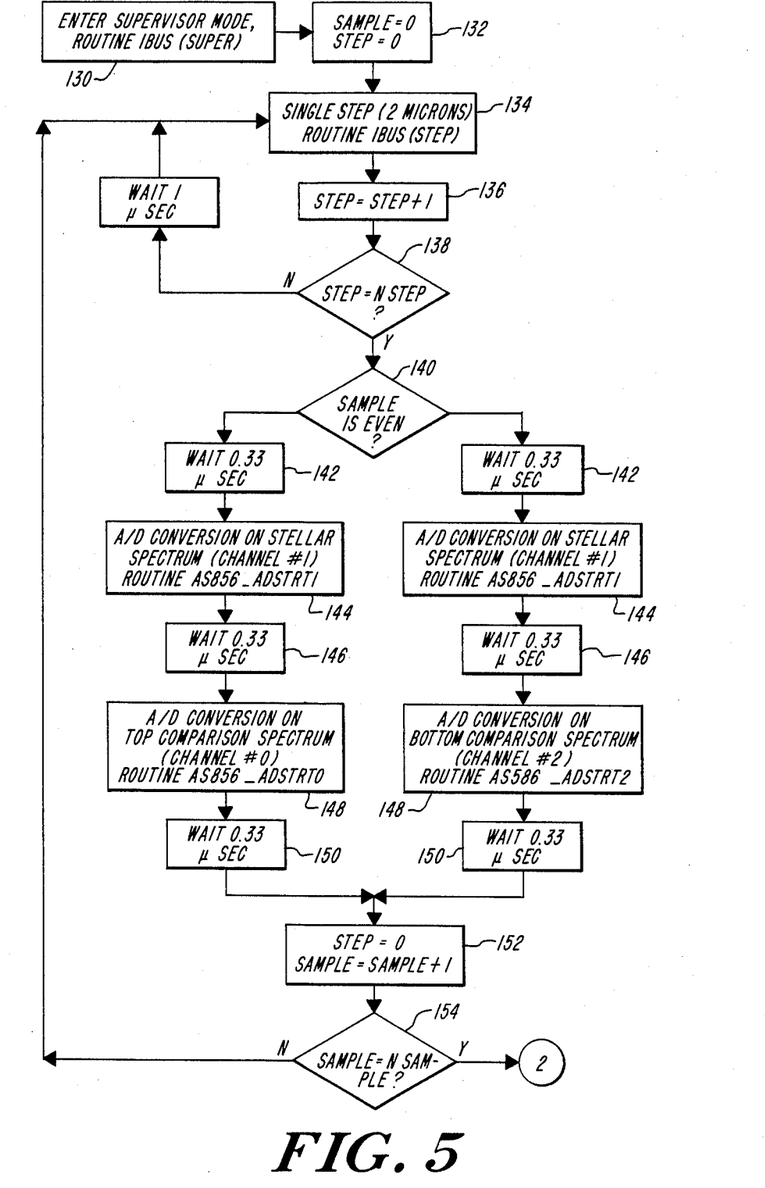

The operation of the invention in data aquisition is illustrated by reference to FIGS. 4 and 5. As shown in FIG. 4, the computer enters the automated sequencing through a start state 120 from which an initialization state 122 sets the number and size of steps for the step drive, typically at 8,000 and 10 microns respectively. From state 122 operation proceeds through a menu state 124 to function states 128, 156, 166, and 172. In decision state 128, the system permits branching to the scanning routines in FIG. 5 or allows modification of the parameters of the system in a series of other steps.

Assuming that the scanning routines are entered, a further initialization state 130 commands the step driver to the zero sample, zero step condition in a step 132. A subsequent state 134 commands the driver to take a single step and indexes the step count one count in state 136. A decision state 138 loops back through state 134 until "n" steps of 2 micron size have been taken. After that reiteration has been satisfied, processing proceeds to a decision 140 which is toggled to branch in alternate directions for each sample pass, which in practice accomplishes the sampling of each reference track on alternate samples thus taking half as many samplings of these as of the central track. The processing of each alternate path is identical except for the addressing of the data destination to keep the track samples separate. This processing includes a wait step 142 (to allow analog settling prior to digitization), subsequent central track data conversion and storage step 144, further wait 146, and alternate reference track detector output conversion and storage step 148. A final wait step 150 leads to a common step 152 which resets the step index to zero and augments the sample count, returning, in step 154, to state 134 if the total sample number has not been reached or to state 124 in FIG. 4 if the sample count has been reached.

In FIG. 4, the alternate path from the state 128 is to a decision state 156 which branches, depending upon the desire to modify parameters. The path to modify is through successive decision states 158 and 160 looping with modification states 162 and 164 respectively. The alternate steps are through a state 166 which branches in one direction through steps 168 and 170 to file the data in the data files 48 or to a state 172 which alternately allows display of the data in a state 174. All modify states lead back to state 124 except the state 172, which if branched away from displaying data, leads to an exit decision 175 which advances in turn to a stop state 176.

Figure 6:
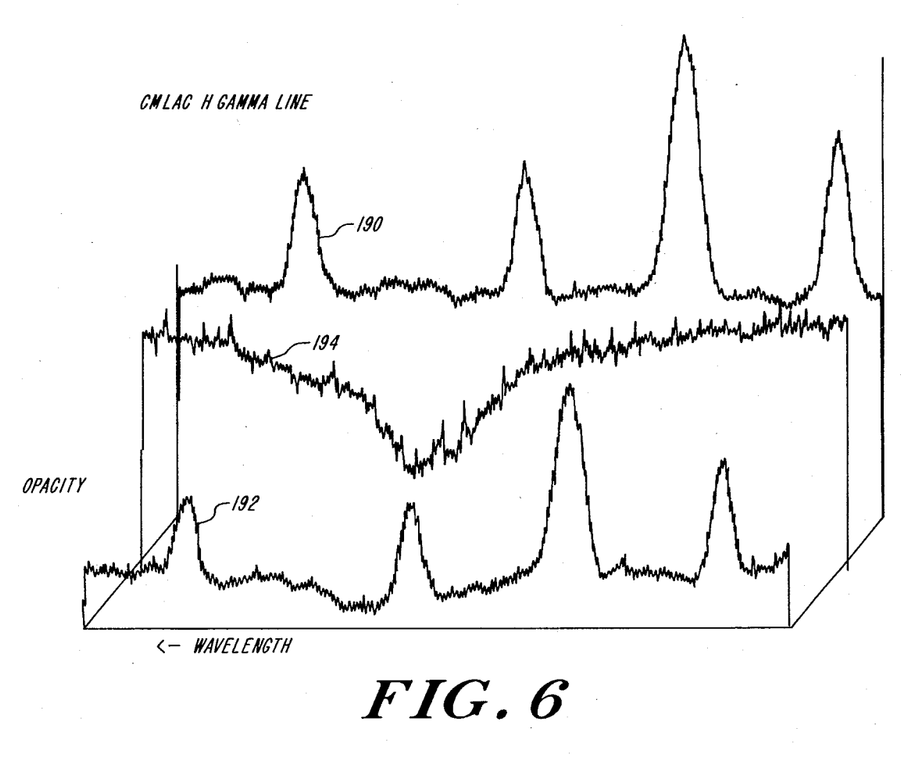
FIG. 6 is a waveform diagram illustrating an output of the photodetectors of the invention.

FIG. 6 illustrates typical analog outputs from the three photodetectors of the densitometer of the present invention. Traces 190 and 192 show the photodetector output from the reference tracks with density peaks occurring at the same position, noting that there is a perspective offset in the representation of the figure. A specimen trace 194 is shown between the two reference traces. It will also have known frequency characteristics due to the commonality of elements throughout the universe. Manual or automated data processing will permit the easy determination of the frequency offset between the traces and accordingly the radial velocity of the celestial body producing the inner trace 194 is readily found.

Other embodiments will occur to the practitioners in the art which are within the scope and spirit of the invention as solely defined in the following claims.

What is claimed is:

1. A densitometer for automated multi-trace, simultaneous scanning of plural spectra tracks adjacent to each other on a substrate comprising:
    means for illuminating the plural spectra tracks with radiation collimated to simultaneously illuminate predetermined portions of the tracks;
    means for supporting said substrate for translational motion relative to said illuminating means in a direction parallel to the direction in which the plural spectra tracks extend on said substrate;
    means for detecting radiation from the simultaneously illuminated portions of the plural tracks;
    means for automatically translating said substrate over a predetermined distance relative to said illuminating means in the direction in which the tracks extend;
    means for providing an output indication in the form of plural electrical signals each corresponding to the density of an associated track at the simultaneously illuminated portions along the direction of translation; and
    means for coordinating said translating means and said output providing means to provide a predetermined association between the plural electrical signals and illuminated portions of said substrate whereby the electrical signals for the same position on adjacent tracks are associated with each other.

2. The densitometer of claim 1 wherein said illuminating means includes:
    a first slit for limiting radiation applied to said tracks; and
    a second slit for limiting radiation from said tracks to said detecting means.

3. The densitometer of claim 2 wherein said substrate is transmissive to said radiation and said first and second slits are located on opposite sides of said substrate.

4. The densitometer of claim 2 further including means for providing adjustment in the path of radiation to said detecting means.

5. The densitometer of claim 4 wherein said adjusting includes means for rotating and translating at least one of said slits.

6. The densitometer of claim 4 further including means for permitting operator viewing of the radiation applied to said detector means to facilitate adjustment.

7. The densitometer of claim 6 wherein said means for permitting operator viewing includes a microscope having a field of view including the simultaneously illuminated predetermined portion of said tracks.

8. The densitometer of claim 2 wherein said detecting means includes a radiation detector for each of said tracks and wherein said adjusting means includes means for adjusting the relative positions of the detectors.

9. The densitometer of claim 1 wherein there are three adjacent tracks, the inner being a specimen track and the outer two being reference tracks.

10. The densitometer of claim 9 wherein said specimen track is a stellar spectrum track.

11. The densitometer of claim 10 wherein said translating means includes means for stepping said substrate relative to said illuminating means in a plurality of equally spaced steps.

12. The densitometer of claim 11 wherein said steps are of a size corresponding at least to 1.0 km/sec. doppler shifts in the specimen track.

13. The densitometer of claim 1 wherein said translating means includes means for stepping said substrate relative to said illuminating means in a plurality of equally spaced steps.

14. The densitometer of claim 13 wherein said means for coordinating includes means for storing said output indication for each step of translation.

* * * * *